June 17, 1958    A. E. CUTLER    2,839,351
COURSE-INDICATING APPARATUS
Filed Sept. 22, 1954

INVENTOR
Albert Ernest Cutler

BY George N. Corey

ATTORNEY.

United States Patent Office 2,839,351
Patented June 17, 1958

2,839,351

COURSE-INDICATING APPARATUS

Albert Ernest Cutler, Crawley, England, assignor to Communications Patents Limited Application September 22, 1954, Serial No. 457,692

Claims priority, application Great Britain October 1, 1953

5 Claims. (Cl. 346—8)

This invention relates to apparatus for providing an indication, which may be a recording, of the ground track and altitude, or relative altitude, of one or more aircraft. The expression "ground track and altitude or relative altitude, of one or more aircraft" is intended to include the assumed movement of one or more flight training devices.

When the ground path of an aircraft is indicated on a first chart and an altitude indication is made on a second chart, both charts must be watched in order to relate the course and altitude of the aircraft. This may be inconvenient, particularly if the course and altitude indications are likely to change rapidly, for example in an exercise in which one aircraft is assumed to be pursuing another and in which the altitude indication shows the relative altitude of one aircraft with respect to the other.

According to one aspect of the invention, course-indicating apparatus comprises a ground track indicator and an altitude indicator which is adapted to provide an indication of the altitude of an aircraft alongside the indication of the ground position of the aircraft given by the ground track indicator.

According to another aspect of the invention, course-indicating apparatus includes a ground track indicator and an altitude indicator which is adapted to indicate the altitude of an aircraft in relation to the indication of the ground position of the aircraft given by the ground track indicator.

According to a further aspect of the invention, course-indicating apparatus comprises a ground track indicator and an altitude indicator which is controlled jointly in accordance with the altitude of an aircraft and its ground position to provide an indication which represents the altitude of the aircraft by its relationship with the indication, which is provided by the ground track indicator, of the ground position of the aircraft.

According to yet another aspect of the invention, course-indicating apparatus for indicating on the same chart the ground tracks of two aircraft and their relative altitude, includes a translucent chart, a first ground track indicating element movable with respect to one face of the chart and a second ground track indicating element movable with respect to the other face of the chart, a given one of the said ground track indicating elements being associated with an altitude indicator which is adapted to indicate the relative altitude of the two aircraft in relation to the indication of the ground position of the aircraft represented by the given ground track indicating element.

The invention is particularly applicable to apparatus for training personnel in flight interception, and to enable the invention to be more readily understood, such an embodiment will now be described, by way of example only, with reference to the accompanying diagrammatic drawings, in which.

Figure 1:
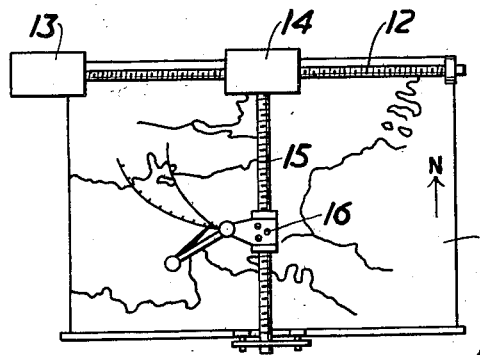
Figure 1 is a plan view of apparatus for recording the ground track and altitude, or relative altitude of an aircraft.

In Figure 1, there is shown a chart 11 on which the course and altitude of an aircraft are to be recorded. A lead-screw 12 which is mounted above the chart and parallel to the east-west direction on the chart, is driven by an integrator motor unit 13 to which there are applied electric signals representative of the east-west (easterly or westerly) ground speed of the aircraft. The integrator motor unit may be of the known kind in which a generator driven by the motor provides a rate signal which opposes the motor input signal.

A further integrator motor unit 14 is mounted on the lead-screw 12 so as to be moved along the latter when the lead-screw 12 is rotated by the motor unit 13. The motor unit 14, to which there are applied electric signals representative of the north-south (northerly or southerly) ground speed of the aircraft, drives a lead-screw 15 which is parallel to the north-south directions on the chart. A recording mechanism 16 is mounted on the lead-screw 15 in such a manner that rotation of this lead-screw causes the mechanism 16 to be moved over the chart in the north-south direction. Since the motor 14, the north-south lead-screw 15 and the marker mechanism 16 are moved as a whole over the chart in an east-west direction when the lead-screw 12 is rotated, the resultant movement of the marker mechanism indicates the ground path of the aircraft on the chart.

Figure 2:
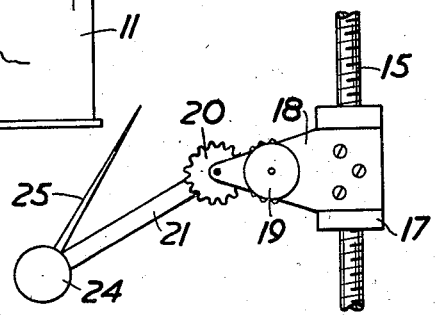
Figure 2 is a detailed view of the altitude recording mechanism.
Figure 3:
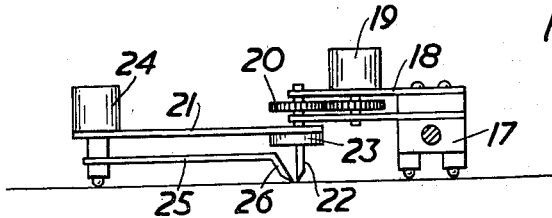
Figure 3 is a view in elevation of the mechanism shown in Figure 2.

The marker mechanism is shown in greater detail in Figures 2 and 3. The block 17 is mounted on the lead-screw 15 so as to be driven thereby for the northerly and southerly movements. The block 17 carries a tongue 18 on which there is mounted the receiver unit 19 of a synchro system, which receiver unit, in use, is connected to a synchro transmitter unit which is rotated in accordance with the heading of the aircraft. The rotatable member of the heading synchro receiver 19 drives, through gearing 20, an arm 21 supported on tongue 18 for pivotal movement of the arm 21 on the tongue 18. To the arm 21 there is affixed the altitude recording mechanism, a ground path recording pen 22 and a time interval marker mechanism 23. In this manner, the arm 21 is always positioned over the chart 11 in line with the heading of the aircraft.

The arm 21 carries a further synchro receiver 24, which is connected to a synchro transmitter which is rotated in proportion to the relative altitude of the aircraft, the ground path of which is being recorded, with respect to another aircraft. The rotatable member of the synchro receiver 24 rotates an arm 25 supported by the arm 21 for pivotal movement of the arm 25 on an axis perpendicular to the surface relative to the arm 21, the arm 25 carrying the altitude recording pen 26, and positions the latter to one side or the other of the ground path pen 22 according to whether the first aircraft is above or below the second, the magnitude of the altitude difference being indicated by the perpendicular distance of the altitude track from the ground path track.

Figure 4:
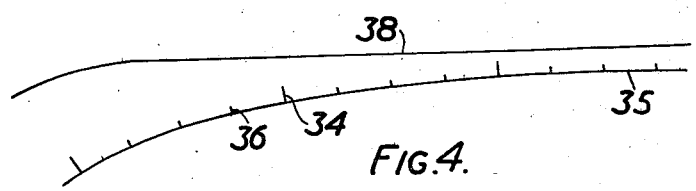
Figure 4 represents typical ground and altitude tracks obtained by means of the apparatus shown in the preceding figures.

In Figure 4, the ground track is represented at 35, and, by conventional means not shown, is marked with lines 34 and 36 which represent time intervals during the flight of the aircraft. The altitude of the aircraft at any point on its course is shown by the distance, perpendicular to the corresponding portion of the ground track, of the altitude track 38.

Figure 5:
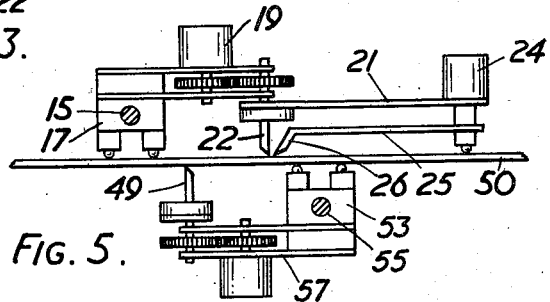
Figure 5 shows apparatus enabling the simultaneous recording of the tracks of two aircraft, and their relative altitude, on a single chart.

Figure 5 shows apparatus for recording the tracks of two aircraft simultaneously on a single chart. The two ground path recording pens 22 and 49 are displaced by two lead-screw systems such as that shown in Figure 1 and record on opposite faces of a lightly frosted thin glass or plastic sheet 50 so that when the sheet is viewed against an illuminated area the two paths will be seen superimposed in different colours. The additional member 53 corresponding to the block 17 is supported beneath the sheet 50 and is moved parallel to the co-ordinates of the chart by operation of the lead screw 55 similar to the lead screw 15 of the device above the sheet 50. The additional pen 49 is supported by a tongue 57 corresponding to the tongue 18 in Figs. 1 and 2. Grid lines may be printed on both sides of the sheet to avoid parallax errors.

One of the ground path recording units, that which includes the pen 22, includes the altitude recording mechanism 24, 25, 26 illustrated in Figures 2 and 3. This altitude recording mechanism is operated in accordance with the relative altitude of the two aircraft, the altitude track appearing to one side or the other of the ground track made by the pen 22 according to whether the aircraft, the course of which is indicated by the pen 22, is above or below the other aircraft.

What I claim is:

1. Apparatus for indicating the course and altitude of aircraft which comprises means providing a surface over which curves may be traced, a member supported for movements thereof parallel to ordinates and parallel to abscissae of said surface, a first element supported by said member adjacent said surface for movement of said first element to trace a curve over said surface according to the composite of the movements of said member parallel to said ordinates and abscissae, electric motor means actuated by electric signals derived from movement of an aircraft along a ground track and operatively connected to said member for effecting said composite movement of said member to move said element to trace a curve over said surface representing said ground track of said aircraft, a second element supported by said member for movement with said member in said composite movement thereof and for movement of said second element relative to said member to and from positions disposed transversely of said ground track curve, and a second electric motor means actuated by electric signals derived from altitude movements of said aircraft and operatively connected to said second element for effecting said movement of said second element transversely of said ground track curve to positions indicating relative to said ground track curve the altitude of said aircraft.

2. Apparatus for indicating the course and altitude of aircraft as defined in claim 1 in which said second element is supported for movement relative to said member so that the distance from said second element to the ground track curve perpendicular to the ground track curve represents the altitude of said aircraft at any point along said ground track.

3. Apparatus for indicating the course and altitude of aircraft as defined in claim 1 in which said second element is supported by said member for pivotal movement of said second element relative to said member on an axis perpendicular to said surface to effect said movement of said second element transversely of said ground track curve.

4. Apparatus for indicating the course and altitude of aircraft which comprises means providing a surface upon which curves may be drawn, a member supported for movements thereof parallel to ordinates and parallel to abscissae of said surface, a first marking element supported by said member adjacent said surface for movement of said first element to draw a curve upon said surface according to the composite of the movements of said member parallel to said ordinates and abscissae, electric motor means actuated by electric signals derived from movement of an aircraft along a ground track and operatively connected to said member for effecting said composite movement of said member to move said element to draw a curve upon said surface representing said ground track of said aircraft, a first arm supported by said member for rotation of said arm about an axis perpendicular to said surface and substantially coincident with said first marking element, a second arm supported by said first arm for pivotal movement of said second arm relative to said first arm on an axis perpendicular to said surface disposed outwardly and spaced along said first arm from said pivotal axis of said first arm, a second marking element carried at a portion of said second arm disposed therealong from said pivotal axis of said second arm, and a second electric motor means actuated by electric signals derived from altitude movements of said aircraft and operatively connected to said second arm for effecting pivotal movement thereof on its axis to move said second element transversely of said ground track curve to positions indicating relative to said ground track curve the altitude of said aircraft by the distance from said second marking element to said ground track curve perpendicular to said ground track curve.

5. Apparatus for indicating the course and altitude of aircraft as defined in claim 1 which comprises a second member supported for movements thereof parallel to said ordinates and to said abscissae of said surface, and a third element supported by said second member adjacent said surface for movement of said third element to trace a curve over said surface according to the composite of the movements of said second member parallel to said ordinates and abscissae, and electric motor means actuated by electric signals derived from movement of a second aircraft along a second ground track and operatively connected to said second member for effecting said composite movement of said second member to move said third element to trace a curve over said surface representing said ground track of said second aircraft, said second element being actuated by electric signals derived from altitude movements of said two aircraft and corresponding to the relative altitude of said aircraft and so that said position of said second element relative to said first ground track indicates said relative altitude of said two aircraft.

References Cited in the file of this patent

UNITED STATES PATENTS

| 1,293,747 | Ford | Feb. 11, 1919 |
| 2,669,500 | Och et al. | Feb. 16, 1954 |
| 2,686,099 | Bomberger et al. | Aug. 10, 1954 |